No. 795,041. PATENTED JULY 18, 1905.
A. O. HUBBARD.
WHEELBARROW.
APPLICATION FILED OCT. 24, 1904.

2 SHEETS—SHEET 2.

WITNESSES

INVENTOR
ARTHUR O. HUBBARD.
BY Paul & Paul
HIS ATTORNEYS.

No. 795,041.                                                           Patented July 18, 1905.

UNITED STATES PATENT OFFICE.

ARTHUR O. HUBBARD, OF MINNEAPOLIS, MINNESOTA.

WHEELBARROW.

SPECIFICATION forming part of Letters Patent No. 795,041, dated July 18, 1905.

Application filed October 24, 1904. Serial No. 229,688.

*To all whom it may concern:*

Be it known that I, ARTHUR O. HUBBARD, of Minneapolis, Hennepin county, Minnesota, have invented certain new and useful Improvements in Wheelbarrows, of which the following is a specification.

The object of my invention is to provide a wheelbarrow having a tray of simple but strong and durable construction, one that can be easily and quickly put together, and in the construction of which small waste pieces of lumber may be utilized.

A further object is to provide a wheelbarrow which will carry the load lower down in the frame of the barrow and nearer the base-line of the wheel, thereby rendering the loaded barrow easier to handle.

Other objects of the invention will appear from the following detailed description.

The invention consists generally in a barrow-tray having flaring walls composed of staves tapered from their outer toward their inner ends and means for binding the staves together.

Further, the invention consists in various constructions and combinations, all as hereinafter described, and particularly pointed out in the claims.

Figure 1:
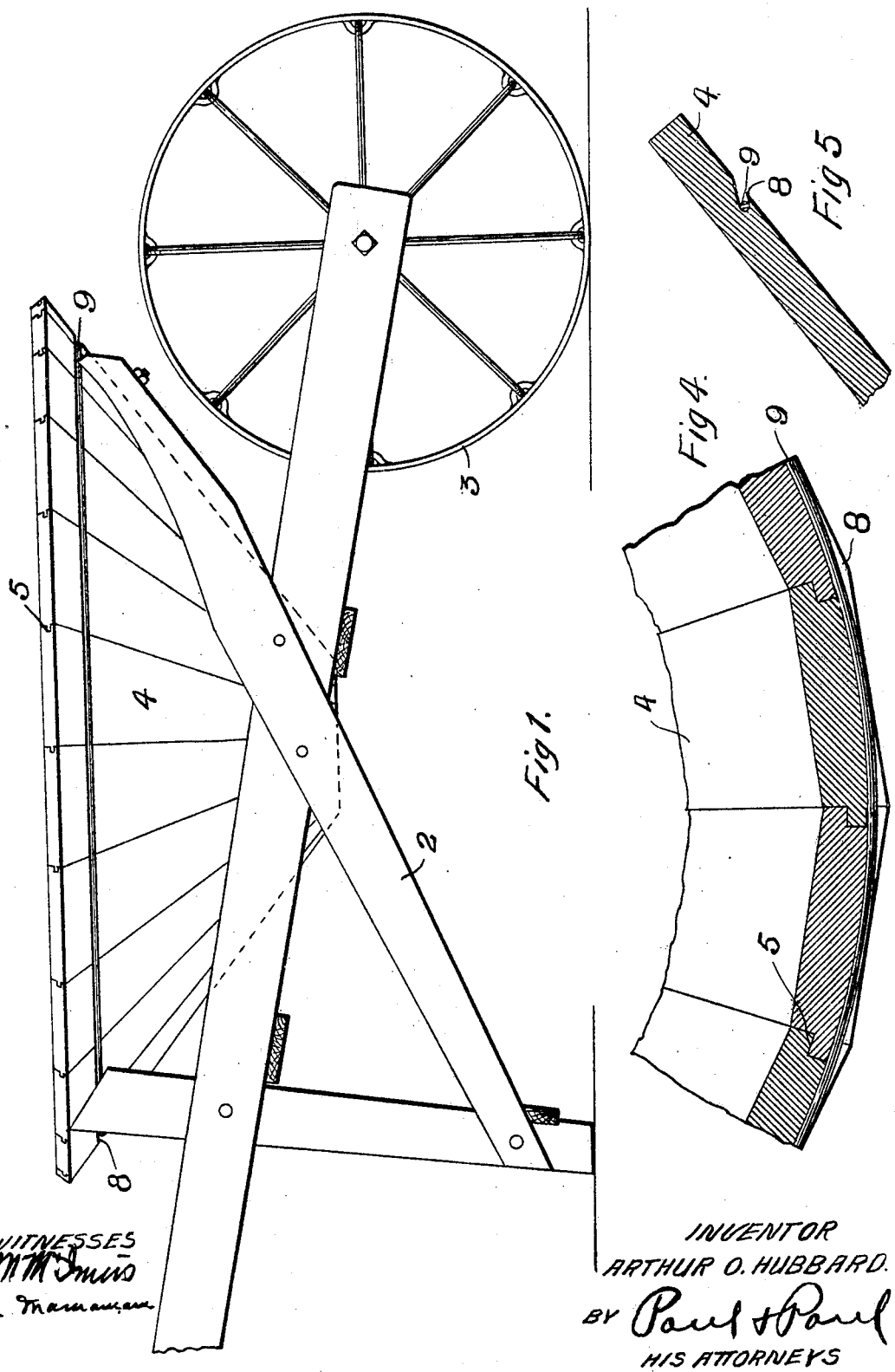
Figure 2:
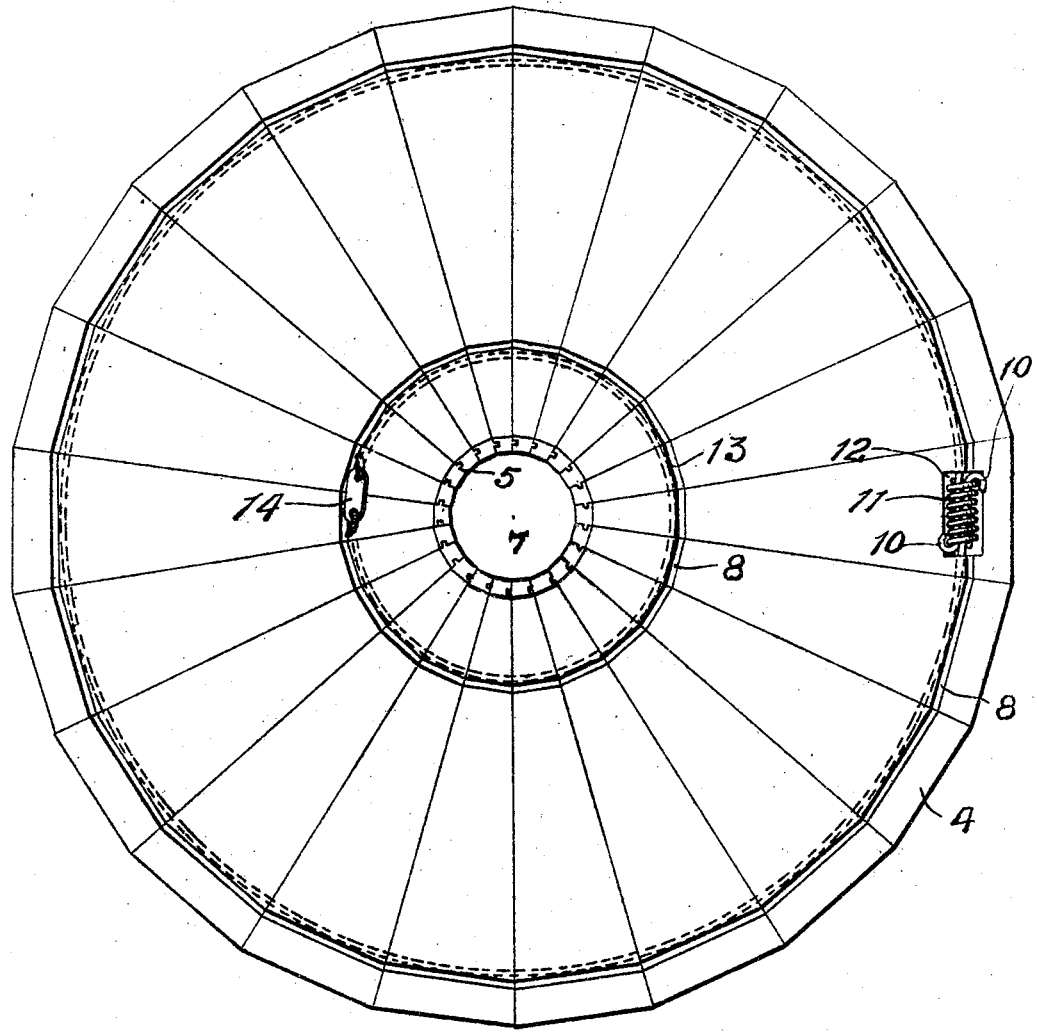
Figure 3:
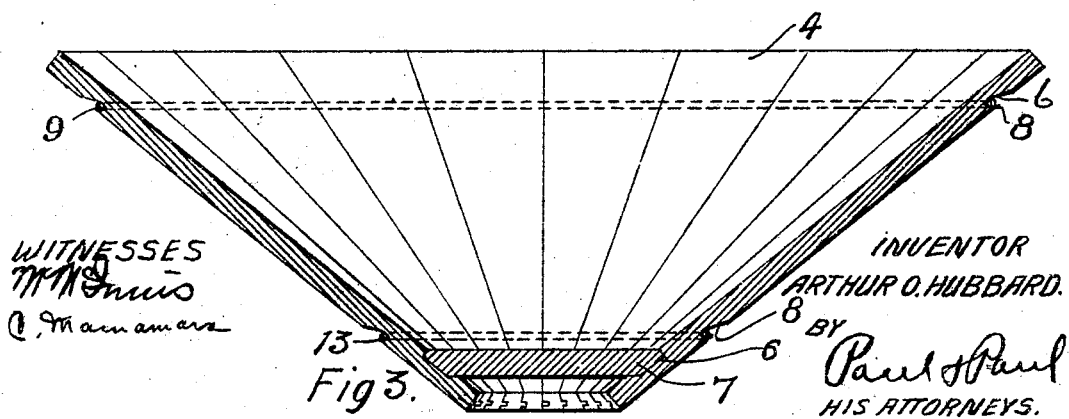

In the accompanying drawings, forming part of this specification, Figure 1 is a side elevation of a wheelbarrow having a tray embodying my invention. Fig. 2 is a plan view of the tray looking toward its under side, the tray being in an inverted position. Fig. 3 is a vertical transverse section through the tray. Figs. 4 and 5 are details showing the manner of supporting the hoops on the staves.

In the drawings, 2 represents the barrow-frame, and 3 the wheel, in the rear of which the tray is supported. This tray, as shown in Figs. 2 and 3, is circular in form, having flaring side walls, the lower ends of which extend down into the frame of the barrow to permit the load to be carried lower in the frame and nearer the base-line of the wheel than in barrow-trays as usually constructed. A further advantage derived from the shape of this barrow-tray is in the ease with which a load can be dumped over the forward quarter of the tray near the wheel, which would not be possible with an ordinary tray, such as is shown in Letters Patent of the United States No. 487,053, issued to me November 29, 1892. Obviously, any attempt to dump the load over either of the forward corners of this tray would result in a portion of the load spilling out at the side, the tray being lower at that point than at the corner. In the tray I have shown in this application the upper edge is on substantially the same level and has the same degree of flare all around, and consequently the load can be readily discharged either at one side or over the forward quarter, as preferred. The flaring side walls of the tray are composed of a series of staves 4, that are tapered from their outer toward their inner ends and have matched edges 5, that form tight joints between the staves. The inner ends of the staves have notches 6 to receive the edge of a bottom-plate 7, the ends of the staves preferably extending below said bottom, as indicated in Fig. 3. The staves are preferably made of narrow pieces of lumber, as indicated in Fig. 2, to enable the manufacturer to utilize all waste pieces of lumber, that ordinarily would be used for fuel. The staves are provided in their outer surfaces with transverse grooves or recesses 8 near their outer and inner ends, these grooves forming when the staves are placed together a continuous annular recess extending entirely around the tray. These recesses, as indicated in Fig. 5, are arranged diagonally with respect to the plane of the stave, so that when the hoops are drawn up they will not only bind the abutting edges of the staves together, but will have a tendency to draw the staves inward lengthwise toward the bottom of the tray, thus preventing any possibility of their working loose in the joints or becoming separated from the bottom-plate. Within the outer groove or recess I provide a wire hoop 9, having hooked ends 10, whereon a compression-spring 11 is placed within a recess 12, provided in said groove. The spring 11 tends to draw the ends of the hoop together and take up all shrinkage of the staves and will also be capable of sufficient compression to allow expansion of the wood in case the tray should be wet and prevent the staves from warping and splitting. The spring will be made of sufficient strength so that it will not be affected by any ordinary load that could be handled in the barrow. The inner groove is provided with a hoop 13, similar to the one described, having its ends connected by a plate 14, which binds them firmly together, the compression-spring being omitted in this hoop as unnecessary. This lower or inner hoop will hold the inner matched edges of the staves together and clamp the bottom-plate securely between them.

I claim as my invention—

1. A barrow-tray having flaring walls composed of a series of staves tapered from their outer toward their inner ends and placed edge to edge, and having transverse slots in their outer surfaces forming, when the staves are placed together, an annular groove extending around the tray, said groove extending into the staves diagonally with respect to the plane thereof, and a hoop fitting within said groove and binding said staves together, and also through the shape of said groove exerting an inward lengthwise action on said staves, substantially as described.

2. A circular barrow-tray having a bottom and upwardly-flaring walls composed of a series of staves placed edge to edge and tapered from their outer toward their inner ends and provided in their outer surface near both ends with transverse slots forming, when the staves are placed together, annular grooves extending around the tray, hoops provided in said grooves, and said grooves dipping downward toward the lower ends of the staves whereby the hoops will not only bind the staves together, but will exert a downward drawing movement thereon, substantially as described and for the purpose specified.

3. The combination, in a wheelbarrow with the frame and wheel of a tray substantially circular in horizontal section having walls that flare outwardly from the bottom of the tray to its upper edge and lie in a plane forming an acute angle with the plane of said bottom on the outside of the tray and overhanging and near the wheel, and the bottom of the tray being on substantially the same level with the axis of the wheel whereby the center of the load is brought nearer the ground and the wheel, for the purpose specified.

4. The combination, in a wheelbarrow, with the frame and wheel, of a tray substantially circular in horizontal section and having walls that flare outwardly from the bottom of the tray to its upper edge, substantially as described.

5. The combination, in a wheelbarrow, with the frame and wheel, of a tray substantially circular in horizontal section and having walls that flare outwardly from the bottom of the tray to its upper edge and with the bottom of the tray arranged on substantially the same level with the axis of the wheel, substantially as described.

In witness whereof I have hereunto set my hand this 6th day of October, 1904.

ARTHUR O. HUBBARD.

Witnesses:
 RICHARD PAUL,
 C. MACNAMARA.